United States Patent Office 2,846,030
Patented Aug. 5, 1958

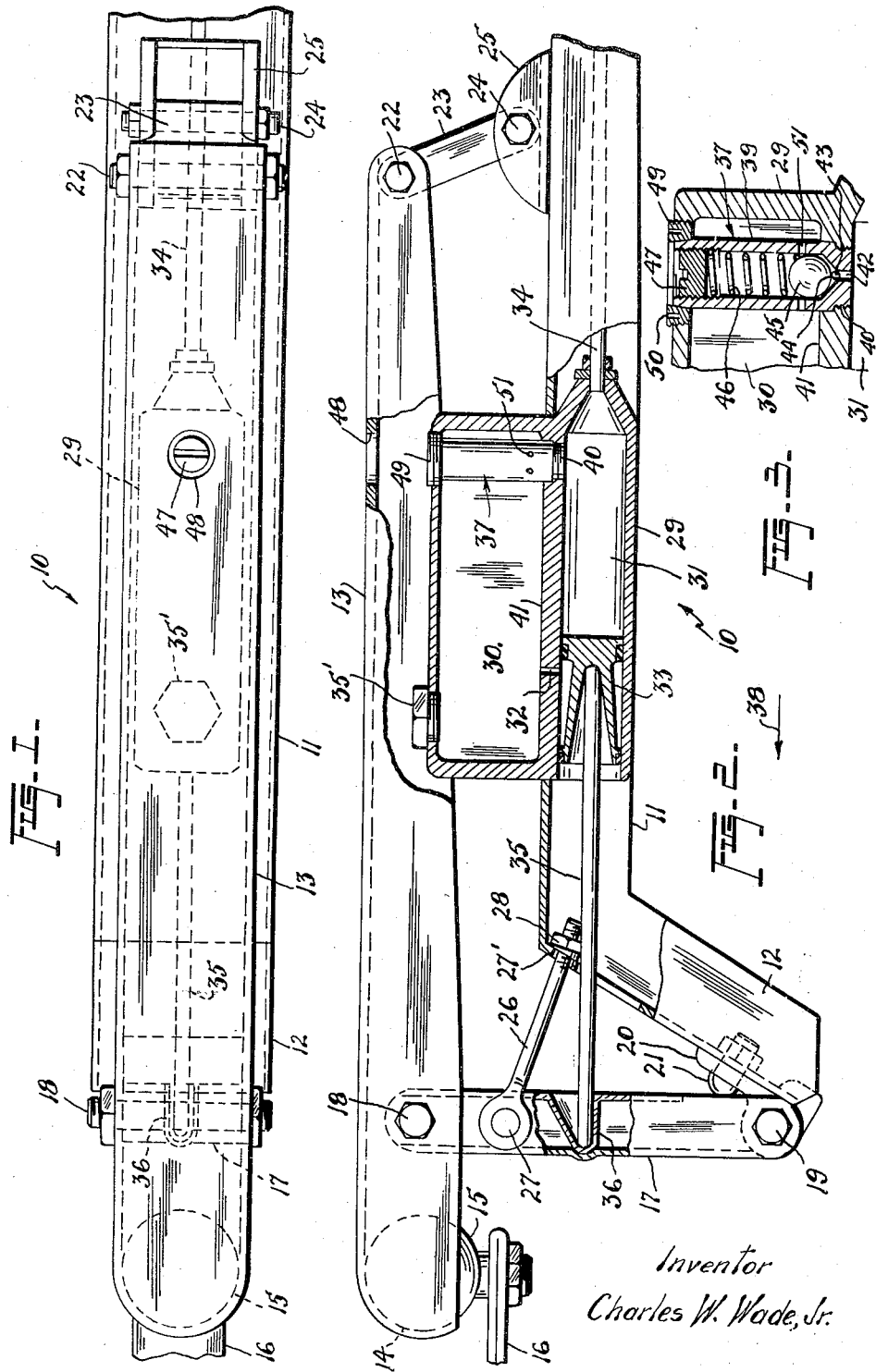

2,846,030
AUTOMATIC BRAKE APPLICATOR FOR TRAILERS
Charles W. Wade, Jr., Austin, Tex.
Application July 5, 1956, Serial No. 596,083
3 Claims. (Cl. 188—112)

This invention relates to new and useful improvements and structural refinements in automatic brake actuators for vehicles, and particularly for non-self-propelled vehicles which depend on another vehicle for their movement, such as by towing or pushing.

The principal object of the invention is to utilize the latent energy or momentum of a moving vehicle to furnish actuating power for energization of its own, self-contained brake system. Thus, in the instance of a towed vehicle such power is furnished by a compressive force existing between the towing and the towed vehicles when the towing vehicle is braked. Alternatively, in the instance of a vehicle being pushed, such power may be stored, as in a compressed spring, and released upon cessation of the pushing force.

Another object of the invention is to facilitate automatic braking of a plurality of towed or pushed vehicles in such manner that the braking system of each is entirely independent of the others and that the actuation of each is effected by only one adjacent vehicle; and that the force of actuation is determined by the momentum proportional to the weight of the vehicle being braked. Thus, the invention automatically compensates for varying load weights and related traction and braking force required for an equal rate of deceleration between the various vehicles which are connected together.

Another object of the invention is to provide instantaneous braking action to eliminate uncoordinated surges of braking force between the towing and towed vehicles and thereby safeguard against any possibility of jack-knifing, loss of traction through skidding, or the like.

Another object of the invention is to provide completely automatic brake release means to facilitate backing-up a brake-equipped towed vehicle.

Another object of the invention is to provide a brake actuating mechanism of this type which functions effectively on two-wheel as well as four-wheel vehicles and which, in the instance of two-wheel or tandem rigged trailers utilizes their weight shifting factor to assist in brake actuation.

Another object of the invention is to facilitate convenient hand braking of a vehicle while it is being manually maneuvered such as in coupling or uncoupling.

Some of the advantages of the invention reside in its simplicity of construction, efficient and dependable operation, and in its adaptability for use on any vehicle equipped with a conventional hydraulic brake system.

With the foregoing more important objects and features in view and such other objects and features as may become apparent as this specification proceeds, the invention resides in the arrangement of parts and details of constructions substantially as shown in the accompanying drawings, wherein like characters of reference are employed to designate like parts and wherein:

Figure 1 is a top plan view of the invention;

Figure 2 is a side elevational view thereof, the same being broken away and shown partly in section to reveal its structure; and Figure 3 is a fragmentary sectional detail, on an enlarged scale, of the pressure release means used in the invention.

Referring now to the accompanying drawings in detail, the automatic brake actuator is designated generally by the reference character 10 and embodies in its construction an elongated member 11 which may be of an inverted channel-shaped configuration and which is provided at its front end with a downwardly and forwardly projecting extension 12. The rear end of the member 11 is suitably connected to a vehicle which is to be towed and, in fact, the member 11 may be in the form of the usual, forwardly projecting draft tongue of such a vehicle.

An elongated bar 13, preferably also of an inverted channel-shaped configuration is disposed above the member 11 and is provided at its front end with a socket 14 to accommodate the usual ball 15 on the draft tongue 16 of a towing vehicle, this ball and socket connection being conventional and well known in the art.

An upwardly elongated yoke 17 of channel-shaped cross-section is pivotally connected at its upper end by a transverse pin or bolt 18 to the front end portion of the bar 13 and is similarly connected at its lower end by a pin or bolt 19 to a bracket 20 which, in turn, is rigidly secured, as by a bolt 21, to the front end of the extension 12 of the member 11.

The rear end of the bar 13 has pivotally connected thereto by a bolt or pin 22 the upper end of a link 23, the latter being substantially shorter than the yoke 17 and having its lower end pivoted by a pin or bolt 24 to a bracket 25, suitably secured to the top face of the member 11. It will be apparent from the foregoing that the member 11 may be moved longitudinally relative to the member or bar 13, and vice versa. This movement of the member 11 in a rearward direction is limited by stop means comprising a pair of transversely spaced eyebolts 26 pivoted to the yoke 17 by a transverse pin 27 and having their screw-threaded end portions slidably extended through suitable apertures 27' formed in the front face of the extension 12. Nuts 28 are provided on the screw-threaded portions of the eye-bolts 26 and, by coming in abutment with the front wall of the extension 12, these nuts limit the extent to which the member 11 may be moved rearwardly with respect to the bar 13. However, forward movement of the member 11 is facilitated by the sliding of the eye-bolts in the apertures 27', as will be clearly understood.

A hydraulic brake master cylinder 29 is suitably mounted in and carried by the member 11, the cylinder 29 including the usual fluid reservoir 30, a pressure chamber 31 in communication with the reservoir through a port 32 in the conventional manner, a piston 33 slidable in the chamber 31, and a pressure line 34 which connects the master cylinder with the wheel cylinders (not shown) of the brake system of the towed vehicle. The reservoir 30 is equipped with a suitable filler plug 35'.

The master cylinder 29 is actuated by a push rod 35 which has its rear end in operative engagement with the piston 33. The rod 35 is substantially parallel to the member 11 and has its front end seated in a socket 36 provided in the yoke 17 at a point below the pin 27. The aforementioned eye-bolts 26 are disposed at opposite sides of the push rod 35, so that the latter does not interfere with the eye-bolts when the member 11 is moved relative to the bar 13.

The master cylinder 29 is also provided with pressure release means designated generally by the reference numeral 37, the construction and operation of which will be hereinafter explained.

With reference to the structure thus far described, it will be noted that when the towing vehicle is braked, a force acting in the direction of the arrow 38 is applied to the member 11 by the momentum of the towed vehicle, so that the member 11 is moved forwardly in the direction of the arrow 38 relative to the bar 13. This action results in a rearward sliding or shifting of the push rod 35 and the piston 33, to energize the brake system of the towed vehicle through pressure of fluid in the line 34. Thus, the towed vehicle will be automatically braked and the braking force so produced will be proportional to the momentum (and load or weight) of the towed vehicle.

As already stated, the link 23 is shorter than the yoke 17. Moreover, the link is disposed in a forwardly inclined position shown in the drawings, when the member 11 is moved rearwardly relative to the bar 13 to the limit permitted by the stop means 26, 28. Accordingly, the pivot pin 22 of the link 23 is disposed forwardly of its top dead center and when the member 11 commences its forward movement in the direction of the arrow 38, the rear end portion of the bar 13 will be necessarily raised until the pivot pins 22, 24 are disposed in a common vertical plane. The force thus required to raise the rear end portion of the bar 13 will eliminate unnecessary actuation of the brake and wear of the system which would otherwise be experienced on rough roads, etc. However, when a positive force is applied by braked deceleration of the towing vehicle, the initial resistance of the actuating mechanism is overcome and forward movement of the member 11 continues beyond the point where the pin 22 is at its top dead center. Since less than the normal pulling force is required to re-extend the actuating mechanism and thereby release the brake of the towed vehicle, there is no disadvantage to the arrangement above described.

It will be apparent from the foregoing that the brake actuation of the towed vehicle is dependent only upon one adjacent vehicle, in this instance, the towing vehicle, which arrangement prevails even if several vehicles are connected together. Moreover, if the invention is applied to a two-wheel towed vehicle, the braking action of the latter produces a downward force on the member 11 which, in turn, is transmitted through the bar 13 and coupling means 14, 15, 16 to the rear of the towing vehicle, thus increasing the traction of the rear wheels of the towing vehicle and tending to equalize the traction of the front and rear wheels against the weight shifting factor of the same, when the brakes are actuated.

When the towed vehicle is manually maneuvered such as during coupling or uncoupling, the bar 13 may be moved rearwardly relative to the member 11 by hand, so as to apply the brakes as required.

The aforementioned pressure release means 37 are primarily intended to facilitate backing-up of the towed vehicle by a pushing action of the towing vehicle, without applying the brakes of the former.

The release means 37 comprise a cylindrical housing 39 having its lower end portion screw-threaded as shown at 40 into the partition wall 41 of the master cylinder 29 between the chamber 31 and the reservoir 30, as is best shown in Figure 3.

The lower end portion of the housing 39 is provided with a fluid inlet port 42 having a frusto-conical seat 43 for a relatively small, spherical valve element or ball 44. A relatively large ball 45, slightly smaller than the inside of the housing, is positioned on the ball 44 and urges the latter against the seat 43 under the action of a compression spring 46, also positioned in the housing. The resiliency of the spring 46 is adjusted by a suitable plug 47 screw-threaded in the upper end portion of the housing and accessible through an opening 48 in the top wall of the bar 13.

The upper end portion of the outer surface of the housing 39 is tapered and fitted into a complementally tapered inner surface of a sealing ring 49 which, in turn, is screw-threaded in the top wall of the reservoir 30. The sealing ring 49 is provided with a plurality of bores 50 to receive a suitable wrench or tool for turning the same. Finally, it will be noted that the interior of the housing communicates with the reservoir 30 through the medium of a plurality of fluid outlet ports 51.

The resiliency of the spring 46 is adjusted so that fluid pressure in the chamber 31 required to unseat the valve ball 44 is greater than that which can be experienced by action of the towed vehicle pressing against the towing vehicle with a functioning brake. Since the momentum of the towed vehicle actuates the brake and, in turn, actuation of the brake absorbs the momentum, there is a definite limit to the potential pressure in the hydraulic system, when both vehicles are in forward motion. On the other hand, when the vehicles are backed-up, there is no balance between the brake actuating force and effective braking but rather, the greater the rearward force applied to the actuating mechanism by the towing vehicle, the greater the resultant pressure. Accordingly, the fluid pressure required to unseat the valve ball 44 may be set safely above the maximum required for braking in forward motion and still be overcome by the power of the towing vehicle when the vehicles are backed-up.

When the ball 44 is unseated, fluid will flow from the chamber 31 to the reservoir 30 through the ports 51, with the result that energization of brakes of the towed vehicle will not occur when it is backed-up by the towing vehicle. Fluid from the reservoir returns to the chamber 31 through the port 32 when the brake is released in the conventional well-known manner.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. An automatic brake actuator for towed vehicles, comprising an elongated member adapted at its rear end for connection to a towed vehicle and provided at its front end with a downturned extension, a bar spaced upwardly from said member and adapted at its front end for connection to a towing vehicle, a substantially vertical yoke pivoted at its upper end to said bar and pivoted at its lower end to the front end of said extension, a socket provided intermediate the ends of said yoke, a link pivoted to said member and to the rear end of said bar whereby to afford longitudinal movement of the member relative to the bar, stop means for limiting movement of the member relative to the bar in a rearward direction, a hydraulic master cylinder carried by said member and adapted to actuate the brake system of the vehicle being towed, said master cylinder including a fluid reservoir and a pressure chamber having a piston slidable therein, and a push rod substantially parallel to said member and having its rear end in operative engagement with said piston, the front end of said push rod being seated in said socket, whereby said master cylinder may be energized when said member moves forwardly relative to said bar.

2. The device as defined in claim 1 together with adjustable pressure release means provided in said master cylinder for permitting escape of fluid from said chamber to said reservoir when the towed vehicle is pushed rearwardly by the towing vehicle.

3. The device as defined in claim 1 wherein said link is shorter than said yoke and is disposed in a forwardly inclined position when said member is moved rearwardly relative to said bar to the limit of said stop means.

References Cited in the file of this patent

UNITED STATES PATENTS

| | | |
|---|---|---|
| 2,149,189 | Shaffer | Feb. 28, 1939 |
| 2,211,025 | Parkes | Aug. 13, 1940 |
| 2,258,876 | Banning | Oct. 14, 1941 |
| 2,320,585 | Gill | June 1, 1943 |
| 2,522,855 | Brown | Sept. 19, 1950 |
| 2,662,616 | De Lateur | Dec. 15, 1953 |
| 2,698,069 | Henry | Dec. 28, 1954 |